(12) United States Patent
Joo et al.

(10) Patent No.: US 11,875,525 B2
(45) Date of Patent: Jan. 16, 2024

(54) METHOD AND CAMERA MODULE FOR ACQUIRING DEPTH INFORMATION

(71) Applicant: LG INNOTEK CO., LTD., Seoul (KR)

(72) Inventors: Yang Hyun Joo, Seoul (KR); Chang Hyuck Lee, Seoul (KR); Hyeong Jin Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 268 days.

(21) Appl. No.: 17/279,412

(22) PCT Filed: Oct. 7, 2019

(86) PCT No.: PCT/KR2019/013136
§ 371 (c)(1),
(2) Date: Mar. 24, 2021

(87) PCT Pub. No.: WO2020/071886
PCT Pub. Date: Apr. 9, 2020

(65) Prior Publication Data
US 2022/0012908 A1 Jan. 13, 2022

(30) Foreign Application Priority Data
Oct. 5, 2018 (KR) .......................... 10-2018-0119343

(51) Int. Cl.
*G06T 7/70* (2017.01)
*H04N 13/128* (2018.01)
*H04N 23/00* (2023.01)
*H04N 13/111* (2018.01)

(52) U.S. Cl.
CPC ............... *G06T 7/70* (2017.01); *H04N 23/00* (2023.01); *H04N 13/111* (2018.05); *H04N 13/128* (2018.05)

(58) Field of Classification Search
CPC .................................. G06T 7/70; H04N 23/00
USPC ......................................................... 348/135
See application file for complete search history.

(56) References Cited

U.S. PATENT DOCUMENTS

| | | | |
|---|---|---|---|
| 2011/0013898 A1* | 1/2011 | Kanai | G03B 13/00 396/114 |
| 2011/0141486 A1 | 6/2011 | Wada et al. | |
| 2017/0097417 A1 | 4/2017 | Wang | |
| 2017/0122731 A1* | 5/2017 | You | G01S 17/36 |

(Continued)

FOREIGN PATENT DOCUMENTS

| | | |
|---|---|---|
| CN | 107018295 A | 8/2017 |
| JP | 2011-122927 A | 6/2011 |
| JP | 2016-223902 A | 12/2016 |

(Continued)

*Primary Examiner* — Amir Shahnami
(74) *Attorney, Agent, or Firm* — Birch, Stewart, Kolasch & Birch, LLP

(57) ABSTRACT

According to one embodiment, disclosed is a method by which a camera module capable of acquiring depth information controls the output time point and the reception time point of light. By controlling both the output time point and the reception time point of light, the camera module can acquire the light of phases in which adjacent reception pixels differ from one another despite controlling light sources or reception pixels in line units.

20 Claims, 13 Drawing Sheets

(56) References Cited

U.S. PATENT DOCUMENTS

2020/0014864 A1   1/2020  Kang

FOREIGN PATENT DOCUMENTS

| KR | 10-2017-0050059 A | 5/2017 |
| KR | 10-2017-0054221 A | 5/2017 |
| KR | 10-2018-0102331 A | 9/2018 |

* cited by examiner

METHOD AND CAMERA MODULE FOR ACQUIRING DEPTH INFORMATION

CROSS REFERENCE TO RELATED APPLICATIONS

This application is the National Phase of PCT International Application No. PCT/KR2019/013136, filed on Oct. 7, 2019, which claims priority under 35 U.S.C. 119(a) to Patent Application No. 10-2018-0119343, filed in the Republic of Korea on Oct. 5, 2018, all of which are hereby expressly incorporated by reference into the present application.

TECHNICAL FIELD

The present disclosure relates to a method and a camera module for obtaining depth information.

BACKGROUND ART

Devices that obtain information by outputting light and reflecting it on an object have been used in various fields. For example, from 3D cameras to distance measurement techniques, technologies for obtaining information by outputting light are being used in several ways.

For example, time of flight (ToF) is a term representing the principle of measuring the distance by measuring the time difference between the time when the light is outputted and the time of reception of the received light reflected and returned from an object, and since implementation method of TOF technology is simple, it is used in various fields such as aviation, shipbuilding, civil engineering, cameras, surveying, and the like.

Also in this regard, there is an increasing need for cameras that have good performance in comparison with hardware.

DETAILED DESCRIPTION OF THE INVENTION

Technical Subject

The present disclosure may provide a method of obtaining depth information and a camera module using the same according to one or more embodiments. By controlling both the output time point and the reception time point of light, the camera module can obtain light of different phases from adjacent reception pixels despite controlling the light source or the reception pixels by line units. The technical problem to be solved is not limited to the technical problems as described above, and various technical problems may be further included within a scope that is obvious to a person skilled in the art.

Technical Solution

A camera module according to a first aspect comprises: a light source array including a plurality of light sources outputting light to an object; a receiver for receiving light reflected from the object through reception pixels; and a processor that obtains depth information on the object by using phase difference between the light outputted from the light source array and the light received by the receiver, wherein the light source array includes light sources on a first output line and light sources on a second output line, wherein the phase difference the between the light outputted from the light sources on the first output line and the light outputted from the light sources on the second output line is a first value, wherein the reception pixels include pixels on a first reception line and pixels on a second reception line, wherein the phase difference between the time point when the light is received at the pixels on the first reception line and the time point when the light is received at the pixels on the second reception line is a second value, and wherein the first value and the second value may be different values.

Also, the difference between the first value and the second value may be 90 degrees. In addition, the first output line and the second output line may be adjacent to each other, and the first reception line and the second reception line may be adjacent to each other.

In addition, the first output line and the second output line are parallel to each other, the first reception line and the second reception line are parallel to each other, and the first output line and the first reception line may be orthogonal to each other.

In addition, a first pixel that is a pixel on the first reception line that receives light outputted from light sources on the first output line, a second pixel that is a pixel on the second reception line that receives light outputted from light sources on the first output line, a third pixel that is a pixel on the first reception line that receives light outputted from light sources on the second output line, and a fourth pixel that is a pixel on the second reception line that receives light outputted from light sources on the second output line may be adjacent to one another.

In addition, the reception time point of light received by the receiver may be different in all of the first to fourth pixels.

In addition, the reception time point of the light received by the receiver may be different by a time corresponding to a 90-degree phase in the first to fourth pixels.

In addition, the processor can increase the resolution by applying a super-resolution technique.

In addition, the receiver includes a first block and a second block obtained by partitioning the reception pixels, and the processor may obtain the depth information using both the light received through the first block and the light received through the second block.

In addition, two pixels among the four pixels included in the first block and the four pixels included in the second block may be overlapped.

In addition, the first value may be 180 degrees, and the second value may be 90 degrees.

In addition, the first value may be 90 degrees, and the second value may be 180 degrees.

A method for obtaining depth information according to the second aspect comprises the steps of: outputting light to an object through pixels on a first output line and pixels on a second output line; receiving light reflected from the object through pixels on a first reception line and pixels on a second reception line; and obtaining depth information on the object by using the phase difference between the outputted light and the received light, wherein the phase difference between the light outputted from the light sources on the first output line and the light outputted from the light sources on the second output line is a first value, and wherein the phase difference between the time point when the light is received at the pixels on the first reception line and the time point when the light is received at the pixels on the second reception line may be a second value.

In addition, the difference between the first value and the second value may be 90 degrees.

In addition, the first output line and the second output line are adjacent to each other, and the first reception line and the second reception line may be adjacent to each other.

In addition, the first output line and the second output line are parallel to each other, the first reception line and the second reception line are parallel to each other, and the first output line and the first reception line may be orthogonal to each other.

The third aspect may provide a computer-readable recording medium in which a program for executing the method according to the second aspect on a computer is recorded.

Advantageous Effects

The present disclosure may provide a method of obtaining depth information and a camera module using the same according to one or more embodiments. By controlling both the output time point of the light and the reception time point of the light, the camera module can obtain light of different phases from adjacent reception pixels even though the light sources or the reception pixels are controlled by line units.

BEST MODE

Hereinafter, preferred embodiments of the present invention will be described in detail with reference to the accompanying drawings.

However, the technical idea of the present invention is not limited to some embodiments to be described, but may be implemented in various forms, and within the scope of the technical idea of the present invention, one or more of the constituent elements may be selectively combined or substituted between embodiments.

In addition, the terms (including technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In the present specification, the singular form may include the plural form unless specifically stated in the phrase, and when described as "at least one (or more than one) of A and B and C", it may include one or more of all combinations that can be combined with A, B, and C.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being 'connected", "coupled", or "jointed" to another component, the component may be directly connected, coupled, or jointed to the other component, however, it should be understood that another element may be "connected", "coupled" or "jointed" between components.

In addition, when described as being formed or arranged in "on (above)" or "below (under)" of each component, "on (above)" or "below (under)" means that it includes not only the case where the two components are directly in contact with, but also the case where one or more other components are formed or disposed between the two components. In addition, when expressed as "upper (upper)" or "lower (lower)", the meaning of not only an upward direction but also a downward direction based on one component may be included.

In addition, the numerical values described below may be interpreted as values within a reasonable range according to errors. For example, a number written as "1" can be interpreted as "1.01".

Hereinafter, embodiments of the present invention will be described in detail with reference to the drawings. Hereinafter, 'light' may be understood as a concept including 'optical signal', and 'signal' may be understood as a concept including 'optical signal', and may be used interchangeably.

Figure 1:
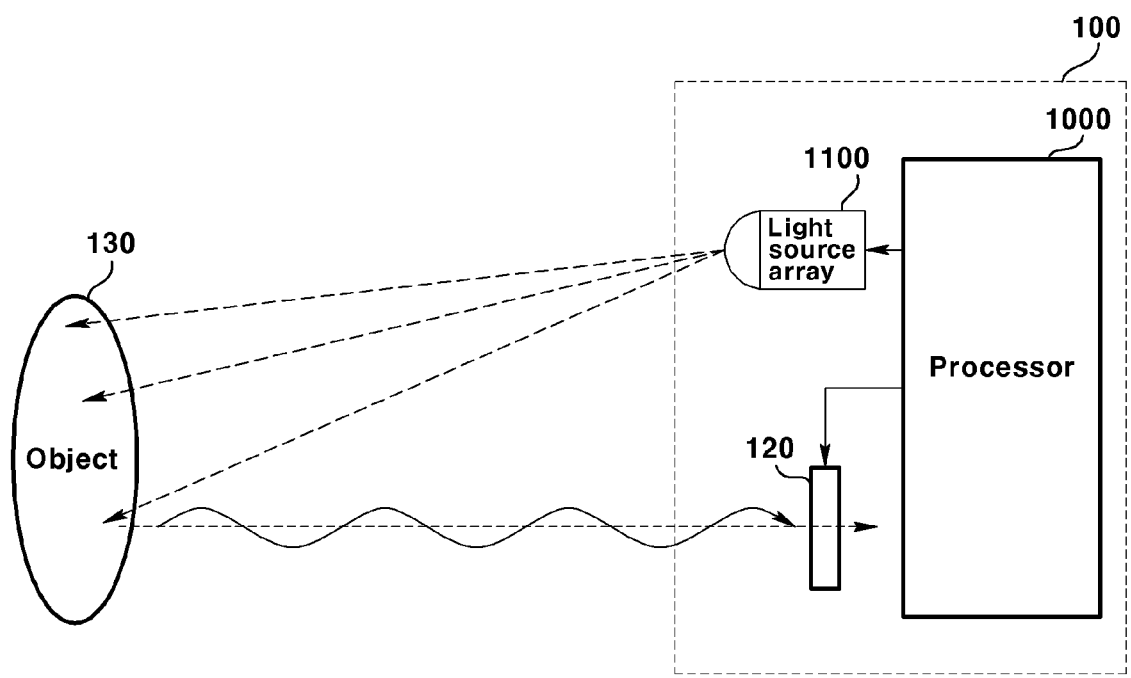
FIG. 1 is a block diagram illustrating a configuration and operation of a camera module according to an embodiment.

FIG. 1 is a block diagram illustrating a configuration and operation of a camera module 100 according to an embodiment.

As illustrated in FIG. 1, the camera module 100 may include a light source array 1100, a processor 1000, and a receiver 120.

However, it can be understood by a person skilled in the art that other general purpose components other than the components illustrated in FIG. 1 may be further included in a camera module 100. For example, the camera module 100 may further include a diffuser through which light outputted from the light source array passes, an optical modulator (not shown) included in the light source array 1100, or a memory (not shown) connected to the processor 1000. The term "memory" can be broadly interpreted to include any electronic component capable of storing electronic information. The term memory may refer to various types of processor-readable media such as a random access memory (RAM), a read-only memory (ROM), a non-volatile random access memory (NVRAM), a programmable read-only memory (PROM), an electrically erasable PROM (EEPROM), flash memory, magnetic or optical data storage, registers, and the like. The memory is said to be in electronic communication with the processor if the processor 1000 can read information from the memory and/or write information to the memory. The memory integrated in the processor 1000 is in electronic communication with the processor.

In addition, memory may include at least one type of storage medium among a flash memory type, a hard disk type, a multimedia card micro type, a card type memory (e.g., SD or XD memory, etc.), a random access memory (RANI), a static random access memory (SRAM), a read-only memory (ROM), an electrically erasable programmable read-only memory (EEPROM), a programmable read-only memory (PROM), a magnetic memory, a magnetic disk, an optical disk.

Alternatively, according to another embodiment, it may be understood by a person skilled in the art that some of the components illustrated in FIG. 1 may be omitted.

The light source array 1100 according to an embodiment may output light. The light outputted from the light source array 1100 may be a wavelength within a preset range.

The light source array 1100 may be, for example, a light-emitting diode (LED) or laser diode (LD) capable of emitting light having an infrared wavelength, and light having a near-infrared (NIR) wavelength of about 850 nm, which is not visible to the human eye for safety, but the wavelength band and the type of light source array are not limited. For example, the wavelength of light outputted from the light source array 1100 may be included in the visible region or the ultraviolet region.

The light source array 1100 may output light, for example, by performing amplitude modulation or phase modulation according to the control signal received from the processor 1000. The light outputted from the light source array 1100 to the object 130 according to the control signal of the processor 1000 may have a form of a periodic continuous function having a preset period. For example, the light may have a specially defined waveform such as a sine wave, a ramp wave, a square wave, or a pulse wave, but may have a general shape that is not defined.

The receiver 120 may receive light reflected from an object 130. The camera module 100 may obtain various pieces of information through the received light received by the receiver 120.

A camera module 100 according to an embodiment may obtain information on an object 130 through the received light. For example, the processor 1000 may obtain information about the object such as the shape, size, color, depth of the object 130, and the like.

The receiver 120 may distinguish a received light obtained by reflecting the light outputted from the light source array 1100 to an object 130 among various lights entering the receiver 120. For example, the receiver 120 may selectively obtain light in the range of 750 nm to 950 nm through filtering when the light source array 1100 outputs light in the range of 750 nm to 950 nm. In addition, the receiver 120 may obtain accurate information about the object 130 by selectively obtaining received light corresponding to the light.

Since the camera module 100 according to an embodiment can extract depth information using the ToF function, it may be understood interchangeably with ToF camera module or ToF module in the present disclosure.

The light source array 1100 may generate light to be outputted and irradiate the object 130 with it. In this case, the light source array 1100 may generate and output light in the form of a pulse wave or a continuous wave. The continuous wave may be in the form of a sinusoid wave or a square wave. By generating light in the form of a pulse wave or a continuous wave, the camera module 100 may determine a phase difference between the light outputted from the light source array 1100 and the light reflected from the object and then received by the camera module 100.

The light source array 1100 may irradiate the generated light onto the object 130 during a preset exposure period. The exposure period may mean one frame period. In the case of generating a plurality of frames, a set exposure period may be repeated. For example, when the camera module 100 photographs an object at 20 FPS, the exposure period is 1/20 second. In addition, when 100 frames are generated, the exposure cycle may be repeated 100 times.

The light source array 1100 may generate a plurality of lights having different frequencies. The light source array 1100 may sequentially and repeatedly generate a plurality of lights having different frequencies. Alternatively, the light source array 1100 may simultaneously generate a plurality of lights having different frequencies.

The light source array 1100 according to an embodiment may output light to an object 130 through a plurality of light sources. The light source array 1100 may include a plurality of light sources, and each of the plurality of light sources may independently output light. For example, a plurality of light sources can output light of different intensities, can output light of different frequencies, can output light of different phases, and output light having different delay times. Each of the plurality of light sources may include a light emitting diode.

The receiver 120 according to an embodiment may receive light through reception pixels. The receiver 120 may receive a reflected light being obtained as the light outputted from the light source array 1100 is reflected from the object 130. The receiver 120 may include reception pixels and each of the reception pixels may receive light independently of one another. For example, reception pixels may receive light at different timings and may receive light using different filtering methods.

The receiver 120 according to an embodiment may include a lens (not shown) and an image sensor. The lens may collect light reflected from the object 130 and transmit it to an image sensor (not shown). The image sensor may receive light and generate an electrical signal corresponding to the received light.

According to an embodiment, the light source array 1100 may output light of a different frequency over time. For example, the light source array 1100 may output light with a frequency $f_1$ during the first half of the exposure period, and output light with a frequency $f_2$ during the other half of the exposure period.

According to an embodiment, some of the plurality of light-emitting diodes included in the light source array 1100 may output light having a frequency $f_1$, and other light emitting diodes may output light having a frequency $f_2$.

In order to control a plurality of light emitting diodes included in the light source array 1100, the light source array 1100 may include a light modulator.

The light source array 1100 may generate light. The light generated by the light source array 1100 may be infrared rays having a wavelength of 770 to 3000 nm, or visible light having a wavelength of 380 to 770 nm. The light source array 1100 may use light emitting diodes (LED), and may have a shape in which a plurality of light emitting diodes are arranged according to a predetermined pattern. The light source array 1100 may include an organic light emitting diode (OLED) or a laser diode (LD). Alternatively, the light source array 1100 may be a vertical cavity surface emitting laser (VCSEL). The VCSEL is one of laser diodes that converts electrical signals into light, and may use a wavelength of about 800 to 1000 nm, for example, about 850 nm or about 940 nm.

The light source array 1100 may repeatedly blink (on/off) at predetermined time intervals and generate light in the form of a pulse wave or a continuous wave. The predetermined time interval may be the frequency of the light. Blinking of the light source array 1100 may be controlled by an optical modulator.

The optical modulator may control blinking of the light source array 1100 to control the light source array 1100 to generate light in the form of a continuous wave or a pulse wave. The optical modulator may control the light source array 1100 to generate light in the form of a continuous wave or a pulse wave through frequency modulation or pulse modulation, or the like.

The processor 1000 according to an embodiment may obtain depth information on the object 130 by using a phase difference between the light outputted from the light source array 1100 and the light received by the receiver 120. The receiver 120 may generate an electric signal corresponding to each reference signal by using a plurality of reference signals having different phase differences. The frequency of the reference signal may be determined equal to the frequency of light outputted from the light source array 1100. Accordingly, when the light source array 1100 generates light with a plurality of frequencies, the receiver 120 may generate an electric signal using a plurality of reference signals corresponding to each frequency. The electrical signal may include information on the amount of charge or the voltage corresponding to each reference signal.

The number of reference signals according to an embodiment may be four, C1 to C4. Each of the reference signals C1 to C4 may have the same frequency as the light outputted from the light source array 1100, but may have a 90-degree phase difference from one another. One of the four reference signals C1 may have the same phase as the light outputted from the light source array 1100. The light obtained by being reflected from the object 130 may be delayed in phase by a distance from which the light outputted from the light source array 1100 is reflected from the object 130 and returned. The receiver 120 may generate signals Q1 to Q4 for each reference signal by mixing the received light and each reference signal, respectively.

The receiver 120 may include an image sensor configured in a structure in which a plurality of pixels is arranged in the form of a grid. The image sensor may be a complementary metal oxide semiconductor (CMOS) image sensor, or may be a charge coupled device (CCD) image sensor. In addition, the image sensor may include a ToF sensor that receives infrared light reflected from an object and measures a distance using time or phase difference.

Specifically, the processor 1000 may calculate a phase difference between the output light and the input light using information on the amount of charge of the electric signal.

As described above, four electrical signals may be generated for each frequency of light outputted from the light source array 1100. Accordingly, the processor 1000 may determine a phase difference $t_d$ between the light outputted from the light source array 1100 and the light received by the receiver 120 by using Equation 1 below.

$$t_d = \arctan\left(\frac{Q_3 - Q_4}{Q_1 - Q_2}\right) \quad \text{[Equation 1]}$$

Here, $Q_1$ to $Q_4$ may be a charge amount of each of the four electric signals. $Q_1$ is the amount of the electric charge of the electric signal corresponding to the reference signal of the same phase as the light outputted from the light source array 1100, $Q_2$ is the electric signal corresponding to the reference signal having a phase lagging 180 degrees behind the light outputted from the light source array 1100, $Q_3$ is the electric signal corresponding to the reference signal having a phase lagging 90 degrees behind the light outputted from the light source array 1100, and $Q_4$ may be the electric signal corresponding to the reference signal having a phase lagging 270 degrees behind the light outputted from the light source array 1100.

Then, the processor 1000 may determine the distance between the object 130 and the camera module 100 using the phase difference between the light outputted from the light source array 1100 and the light received by the receiver 120. In this case, the processor 1000 according to an embodiment may determine the distance d between the object 130 and the camera module 100 using Equation 2.

$$d = \frac{c}{2f} \frac{t_d}{2\pi} \quad \text{[Equation 2]}$$

Here, c is the speed of light, and f may be the frequency of the output light.

According to an embodiment, a ToF IR image and a depth image may be obtained from the camera module 100.

The processor 1000 according to an embodiment may obtain depth information on an object 130 by using a difference between the time point at which the light source array 1100 outputs light and the time point at which the receiver 120 receives the light. The light source array 1100 may obtain depth information by outputting light such as a laser or infrared light toward the object 130, receiving reflected and returned light, and calculating a time difference.

Figure 2:
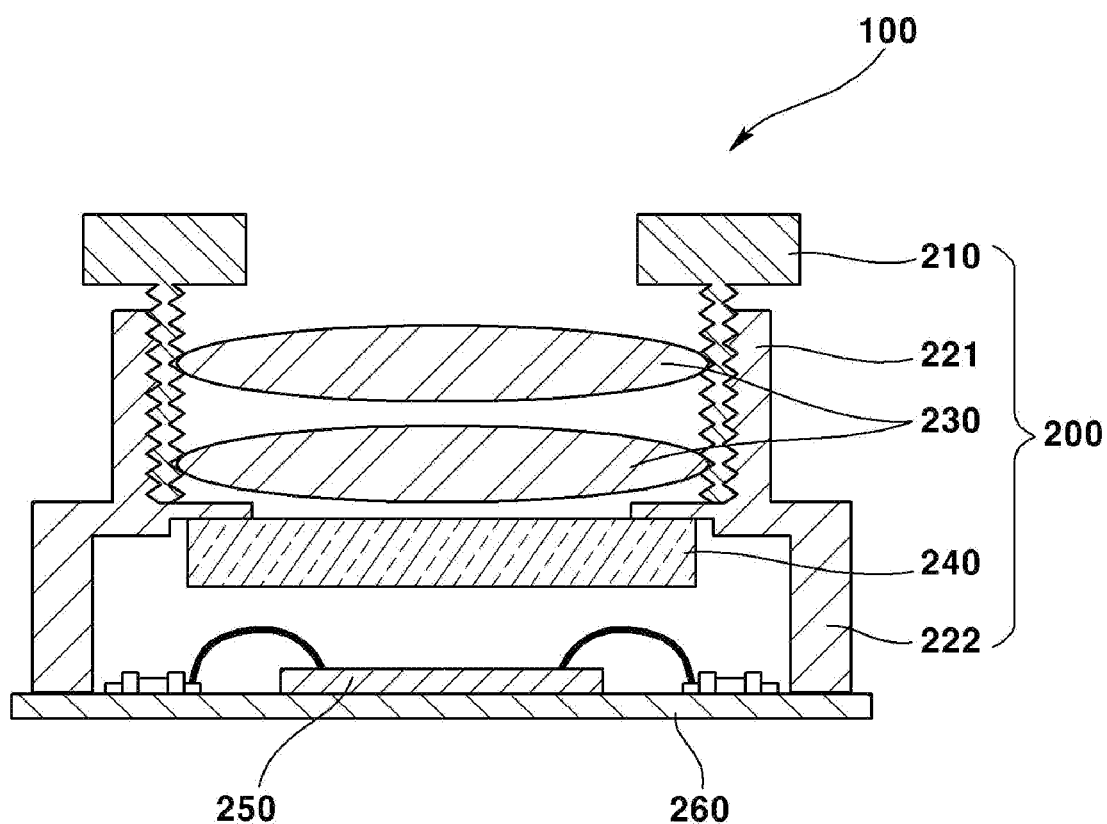
FIG. 2 is a cross-sectional view of a camera module according to an embodiment.

FIG. 2 is a cross-sectional view of a camera module 100 according to an embodiment.

Referring to FIG. 2, the camera module 100 includes a lens assembly 200, an image sensor 250, and a printed circuit board 260. The processor 1000 of FIG. 1 and the like may be implemented within the printed circuit board 260. Although not illustrated, the light source array 1100 of FIG.

1 is disposed on a side surface of the image sensor 250 on the printed circuit board 260 or it may be disposed outside the camera module 100, for example, on a side surface of the camera module 100, but is not limited thereto.

The lens assembly 200 may include a lens 230, a lens barrel 210, lens holders 221 and 222, and an IR filter 240.

The lens 230 may be composed of a plurality of elements, or may be composed of one element. When the lens 230 is formed of a plurality of elements, each of the lenses may be aligned with respect to a central axis to form an optical system. Here, the central axis may be the same as the optical axis of the optical system.

The lens barrel 210 is coupled to the lens holders 221 and 222, and a space for accommodating lenses may be provided therein. The lens barrel 210 may be rotationally coupled with one or a plurality of lenses, but this is exemplary, and it may be coupled in other ways, such as a method using an adhesive (for example, an adhesive resin such as epoxy).

The lens holders 221 and 222 may be coupled to the lens barrel 210 to support the lens barrel 210, and may be coupled to the printed circuit board 260 on which the image sensor 250 is mounted. A space in which the IR filter 240 can be attached may be formed under the lens barrel 210 by the lens holders 221 and 222. A spiral pattern may be formed on an inner circumferential surface of the lens holders 221 and 222, and similarly, the lens barrel 210 having a spiral pattern formed on an outer circumferential surface may be rotationally coupled. However, this is exemplary, and the lens holders 221 and 222 and the lens barrel 210 may be coupled through an adhesive, or the lens holders 221 and 222 and the lens barrel 210 may be integrally formed.

The lens holders 221 and 222 may be divided into an upper holder 221 coupled to the lens barrel 210 and a lower holder 222 being coupled to the printed circuit board 260 on which the image sensor 250 is mounted, The upper holder 221 and the lower holder 222 may be integrally formed, formed in a structure separated from each other, and then fastened or combined, or may have a structure separated from each other and spaced apart from each other. In this case, the diameter of the upper holder 221 may be formed smaller than the diameter of the lower holder 222, but is not limited thereto.

The above example is only an embodiment, and the lens 230 may be configured with another structure capable of collimating light incident on the camera module 100 and delivering it to the image sensor 250.

The image sensor 250 may generate an electrical signal by using the light collimated through the lens 230.

The image sensor 250 may detect input light in synchronization with the blinking period of the light source array 1100. Specifically, the image sensor 250 may detect the light outputted from the light source array 1100 at in-phase and out-phase, respectively. That is, the image sensor 250 may repeatedly perform a step of absorbing light when the light source array 1100 is turned on and a step of absorbing light when the light source array 1100 is turned off.

The image sensor 250 may generate an electric signal corresponding to each reference signal by using a plurality of reference signals having different phase differences. The frequency of the reference signal may be determined equal to the frequency of light outputted from the light source array 1100. Therefore, when the light source array 1100 generates light with a plurality of frequencies, the image sensor 250 may generate an electric signal using a plurality of reference signals corresponding to each frequency. The electrical signal may include information on an amount of charge or voltage corresponding to each reference signal.

The processor 1000 according to an embodiment may control a delay time of light outputted from each of the plurality of light sources, and may determine a direction of light outputted through the plurality of light sources. Hereinafter, an embodiment in which the processor 1000 determines a direction of light by controlling a delay time is illustrated.

Figure 3:
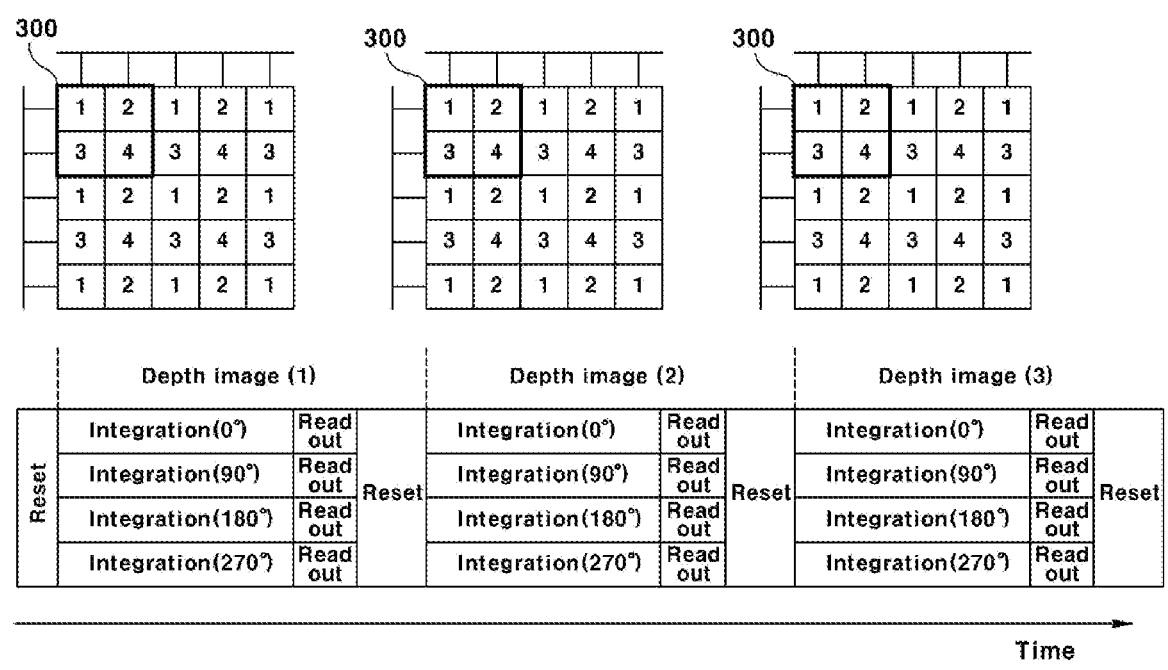
FIG. 3 schematically illustrates an example of a method of obtaining a depth image using four phase images.
Figure 4:
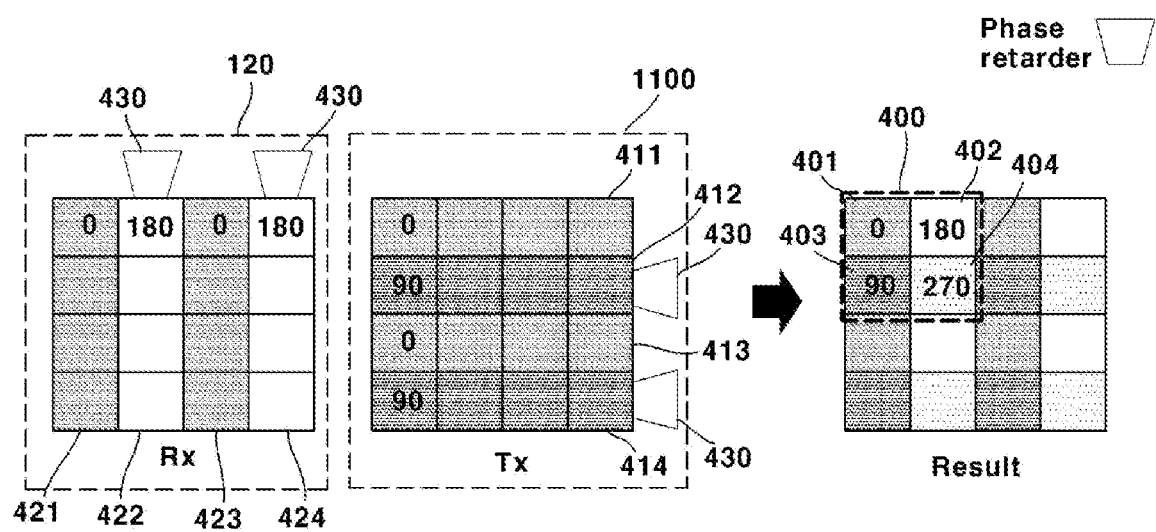
FIG. 4 is a diagram showing an example in which a camera module according to an embodiment controls reception pixels included in the receiver and a plurality of light sources included in the light source array by line units, thereby applying different phase signals to the reception pixels included in the block during each period T.

FIG. 3 briefly illustrates an example of a method of obtaining a depth image using four phase images, and FIG. 4 illustrates the method of FIG. 3 in detail.

Referring to FIG. 3, the camera module may sequentially obtain a first depth image (1), a second depth image (2), and a third depth image (3). Specifically, the camera module 100 obtains the first depth image (1) by obtaining a 0-degree phase image, a 90-degree phase image, a 180-degree phase image, and a 270-degree phase image in the first first-period, obtains the second depth image (2) by obtaining a 0-degree phase image, a 90-degree phase image, a 180-degree phase image, and a 180-degree phase image in the second first-period, and may obtain the third depth image (3) by obtaining a 0-degree phase image, a 90-degree phase image, a 180-degree phase image, and a 180-degree phase image in the third first-period.

Specifically, the first to fourth pixels included in the block 300 can respectively obtain a 0-degree phase image, a 90-degree phase image, a 180-degree phase image, and a 270-degree phase image in one period. Which of the first to fourth pixels will obtain which phase image may be determined according to a predetermined setting. The first to fourth pixels may be reception pixels.

Since the intensity of a signal received once from the time of opening to the time of closing of the pixel is weak, the camera module 100 according to an embodiment may repeat the same process several times to obtain a depth image. For example, the block 300 may repeat a process of obtaining a phase image several times, for example, 100 or more times to obtain a depth image through integration or accumulation of the signal.

Referring to FIG. 3, a different phase signal may be applied for each pixel included in the block 300 during each period T. For example, the block 300 may include a first pixel, a second pixel, a third pixel, and a fourth pixel, and a 0-degree phase signal is applied to the first pixel during each period T, a 90-degree phase signal may be applied to the second pixel, a 180-degree phase signal may be applied to the third pixel, and a 270-degree phase signal may be applied to the fourth pixel, but are not limited thereto.

Since the strength of the signal received by each pixel during one period T is weak, the same process may be repeated several times. The camera module 100 may integrate or accumulate signals by repeating a period T in which a phase signal different for each pixel is applied several times, for example, 100 or more times. Thereafter, information on 0-degree phase is read out from the first pixel, information on 90-degree phase is read out from the second pixel, and information on 180-degree phase is read out from the third pixel, and information on 270-degree phase can be read out from the fourth pixel. In addition, the first depth image (1) can be obtained using information about 0-degree phase obtained from the first pixel, information about 90-degree phase obtained from the second pixel, information about 180-degree phase obtained from the third pixel, and information about 270-degree phase from the fourth pixel.

In this way, a different phase signal is applied for each pixel included in one block 30 during each period T, and when a depth image is extracted using information about each phase obtained from each pixel, the time required for obtaining a depth image can be reduced.

During each period T, a different phase signal may be applied to the neighboring pixels, and during each period T, at least a portion of at least two among the section where a 0-degree phase signal is applied to the first pixel, the section where a 90-degree phase signal is applied to the second pixel, the section where a 180-degree phase signal is applied to the third pixel, and the section where a 270-degree phase signal is applied to the fourth pixel, may be overlapped with one another. Accordingly, the time required to obtain one depth image can be reduced compared to the case in which the section where the 0-degree phase signal is applied, the section where the 90-degree phase signal is applied, the section where the 180-degree phase signal is applied, and the section where the 270-degree phase signal is applied are not overlapped with one another.

FIG. 4 is a diagram showing an example in which a camera module 100 according to an embodiment controls reception pixels included in the receiver 120 and a plurality of light sources included in the light source array 1100 by line units, thereby applying different phase signals to the reception pixels included in the block 400 during each period T.

The plurality of light sources include light sources on a first output line 411 and light sources on a second output line 412, and the phase difference of the light outputted from the light sources on the first output line 411 and the light outputted from the light sources on the second output line 412 may be a first value. In addition, reception pixels includes pixels on a first reception line 421 and pixels on a second reception line 422, and the phase difference between the time point at which the pixels on the first reception line 421 receive light and the time point at which the pixels on the second reception line 422 receive light may be a second value. At this time, the first value and the second value may be different. For example, the difference between the first value and the second value may be 90 degrees. For example, as illustrated in FIG. 4, the first value may be 90 degrees and the second value may be 180 degrees. As another example, the first value may be 180 degrees, and the second value may be 90 degrees. As another example, the first value may be 270 degrees, and the second value may be 180 degrees. As another example, the first value may be 180 degrees and the second value may be 270 degrees, but is not limited thereto.

Referring to FIG. 4, the first output line 411 and the second output line 412 may be adjacent to each other, and the first reception line 421 and the second reception line 422 may be adjacent to each other.

Referring to FIG. 4, the first output line 411 and the second output line 412 are in a horizontal direction, and the first reception line 421 and the second reception line 422 are in a vertical direction, but are not limited thereto. In addition, the first output line 411 and the second output line 412 may be parallel to each other, and the first reception line 421 and the second reception line 422 may be parallel to each other. In addition, the first output line 411 and the first reception line 421 or the second reception line 422 may be orthogonal to each other.

Referring to FIG. 4, the first output line 411 is disposed above the second output line 412, and the first reception line 421 is disposed to the left of the second reception line 422, but is not limited thereto. For example, the first output line 411 may be disposed below the second output line 412, or the first reception line 421 may be disposed to the right of the second reception line 422.

Referring to FIG. 4, a block 400 may include a first pixel 401, a second pixel 402, a third pixel 403, and a fourth pixel 404. The first pixel 401, the second pixel 402, the third pixel 403, and the fourth pixel 404 may be reception pixels.

The first pixel 401 is a pixel on the first reception line 421 that receives light outputted from light sources on the first output line 411, and the second pixel 402 is a pixel on the second reception line 422 that receives light outputted from light sources on the first output line 411, the third pixel 403 is a pixel on the first reception line 421 that receives the light outputted from the light sources on the second output line 412, and the fourth pixel 404 may be a pixel on the second reception line 422 that receives light outputted from light sources on the second output line 412.

The processor 1000 according to an embodiment may control a plurality of light sources included in the light source array 1100 in units of lines. A phase retarder 430 may delay the phase for each line. Referring to FIG. 4, a phase retarder 430 may be connected to the second output line 412 and the second reception line 422. The phase retarder 430 may delay the phase by 90 degrees or 180 degrees.

Accordingly, the phase of the light outputted from the second output line 412 may be delayed by 90 degrees from the light outputted from the first output line 411. Alternatively, the timing at which the light is outputted from the second output line 412 may be delayed by a time corresponding to the 90-degree phase from the time when the light is outputted from the first output line 411.

In addition, a time point at which light reception starts at the second reception line 422 may be delayed by a time corresponding to 180-degree phase from a time point at which light reception starts at the first reception line 421.

Light outputted from the first output line 411 may be received at the first pixel 401 included in the first reception line 421. Since the light outputted from the first output line 411 was delayed by 0 degree, and the reception time point of the light at the reception line 421 was delayed by 0 degree compared to the light output time point, a 0-degree phase signal can be applied to the first pixel 401.

Light outputted from the first output line 411 may be received at the second pixel 402 included in the second reception line 422. Since the light outputted from the first output line 411 was delayed by 0 degree, and the reception time point of light at the second reception line 422 was delayed by 180 degrees compared to the light output time point, a 180-degree phase signal may be applied to the second pixel 402.

Light outputted from the second output line 412 may be received at the third pixel 403 included in the first reception line 421. Since the light outputted from the second output line 412 was delayed by 90 degrees, and the reception time point of light at the first reception line 421 was delayed by 0 degree compared to the light output time point, a 90-degree phase signal can be applied to the third pixel 403.

The light outputted from the second output line 412 may be received at the fourth pixel 404 included in the second reception line 422. Since the light outputted from the second output line 412 was delayed by 90 degrees, and the reception time point of the light at the second reception line 422 was delayed by 180 degrees compared to the light output time point, a 270-degree phase signal may be applied the fourth pixel 404.

The reception time point of the light received by the block 400 may be different in all of the first pixel 401, the second pixel 402, the third pixel 403, and the fourth pixel 404. For example, a phase signal (or a reception time point of light) applied to the first pixel 401, the second pixel 402, the third pixel 403, and the fourth pixel 404 may be different by 90 degrees. Referring to FIG. 4, a 0-degree phase signal is applied to the first pixel 401, a 180-degree phase signal is applied to the second pixel 402, a 90-degree phase signal is applied to the third pixel 403, and a 270-degree phase signal is applied to the fourth pixel 404, but is not limited thereto, and the type of the phase signal applied to each pixel may vary depending on which line the phase retarder 430 is connected to.

Referring to FIG. 4, the third output line 413 and the fourth output line 414 may correspond to a first output line 411 and a second output line 412, respectively. Specifically, the third output line 413 may output light delayed by 0 degree, and the fourth output line 414 may output light delayed by 90 degrees. In addition, the optical reception time point of the third reception line 423 may be delayed by 0 degree, and the optical reception time point of the fourth reception line 424 may be delayed by 180 degrees.

Unlike illustrated in FIG. 4, the arrangement of the first output line 411 and the second output line 412, and the arrangement of the first reception line 421 and the second reception line 422 may be changed. In addition, a phase delayed by the phase retarder 430 applied to a plurality of light sources and a phase delayed by the phase retarder 430 applied to reception pixels may be different. However, the phase signals applied to the first pixel 401, the second pixel 402, the third pixel 403, and the fourth pixel 404 included in the block 400 are different from one another, and it may correspond to any one among 0 degree, 90 degrees, 180 degrees, and 270 degrees, respectively.

Figure 5:
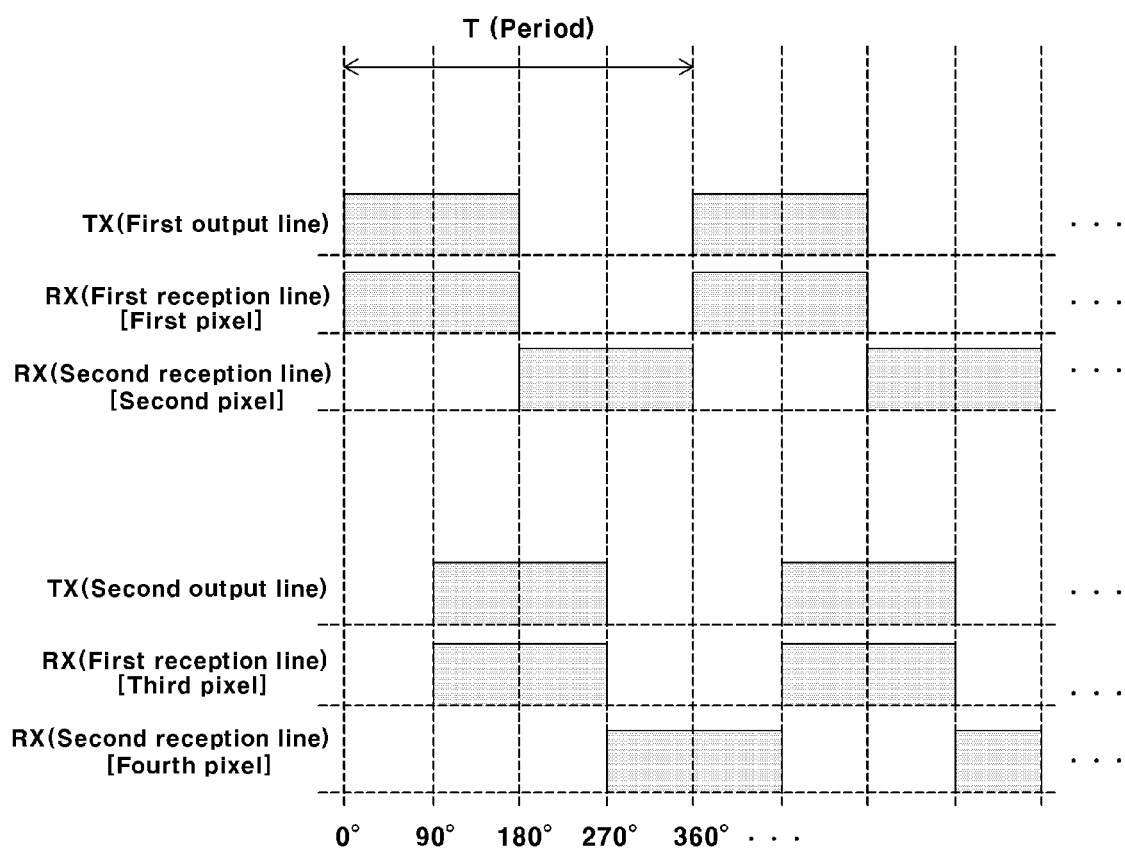
FIG. 5 is a timing diagram illustrating the operation of the camera module of FIG. 4 over time.

FIG. 5 is a timing diagram illustrating the operation of the camera module 100 of FIG. 4 over time.

As illustrated in FIG. 4, since the phase retarder 430 is connected to the second output line 412 in the light source array 1100, the light outputted from the first output line 411 is delayed by 0 degree. Then, the light outputted from the second output line 412 may be delayed by 90 degrees.

As illustrated in FIG. 4, since the phase retarder 430 is connected to the second reception line 422 in the receiver 120, the time point at which the light reception starts at the first reception line 421 is delayed by 0 degree, and a time point at which light reception is started from the second reception line 422 may be delayed by 180 degrees.

Therefore, referring to FIG. 5, the light outputted from the first output line 411 is outputted after being delayed by 0 degree, and since the first pixel 401 that is the pixel on the first reception line 421 receives the light outputted from the first output line 411 delayed by 0 degree, the first pixel 401 may receive a 0-degree phase signal.

In addition, the light outputted from the first output line 411 is outputted after being delayed by 0 degree, and since the second pixel 402 that is the pixel on the second reception line 422 receives the light outputted from the first output line 411 delayed by 180 degrees, the second pixel 402 may receive a 180-degree phase signal. In addition, the light outputted from the second output line 412 is outputted after being delayed by 90 degrees, and since the third pixel 403 that is the pixel on the first reception line 421 receives the light outputted from the second output line 412 delayed by 0 degree, the third pixel 403 may receive a 90-degree phase signal.

In addition, the light outputted from the second output line 412 is outputted after being delayed by 90 degrees, and since the fourth pixel 404 that is the pixel on the second reception line 422 receives the light outputted from the second output line 412 delayed by 180 degrees, the fourth pixel 404 may receive a 270-degree phase signal.

Figure 6:
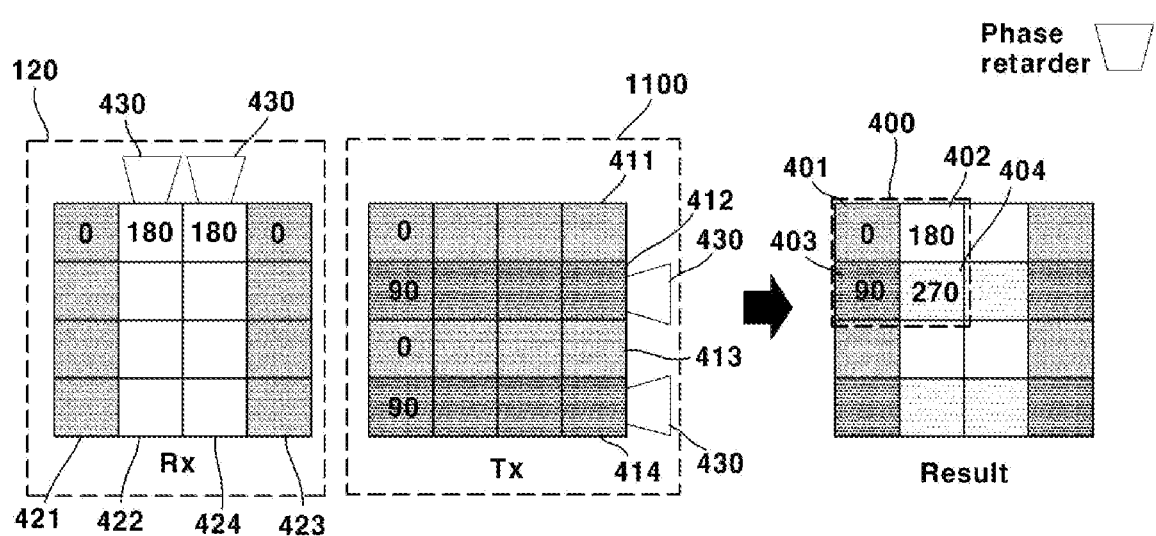
FIG. 6 is a diagram illustrating an example of a case in which a 90-degree phase retarder is used for a light source array, a 180-degree phase retarder is used for a receiver, and a reception line to which a 180-degree phase retarder is connected is adjacent.
Figure 7:
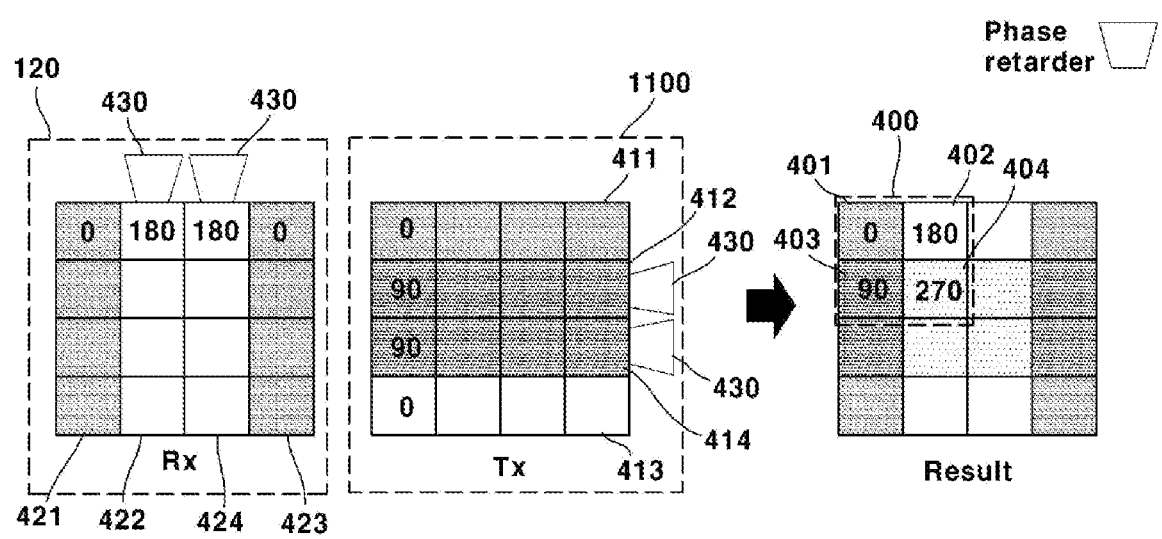
FIG. 7 is a diagram illustrating an example of a case in which a 90-degree phase retarder is used for a light source array, a 180-degree phase retarder is used for a receiver, and an output line to which a 90-degree phase retarder is connected is adjacent.
Figure 8:
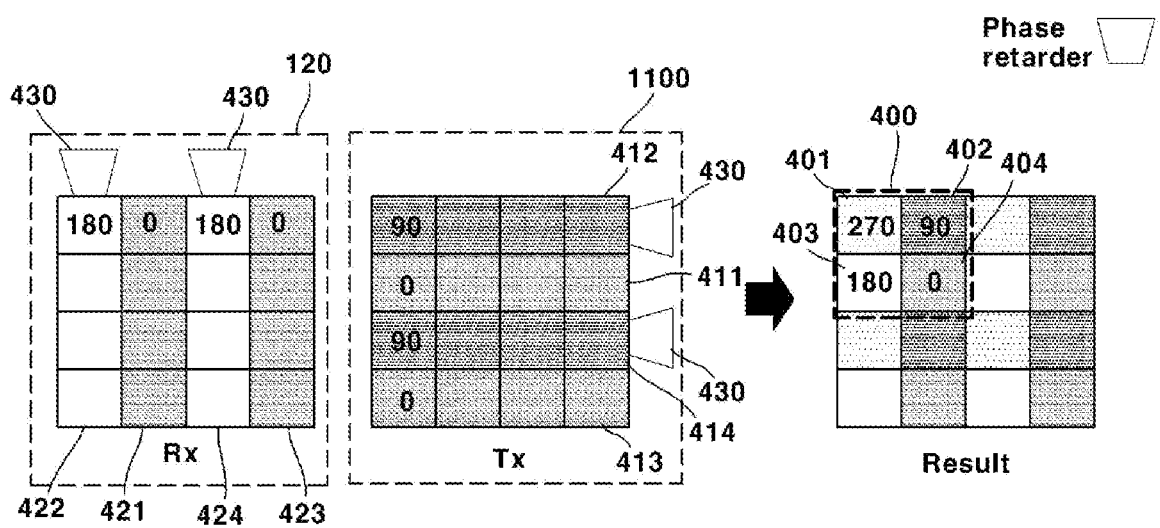
FIG. 8 is a diagram illustrating an example of a case in which a 90-degree phase retarder is used for a light source array, a 180-degree phase retarder is used for a receiver, and the line to which the phase retarder is connected in the reception line and the output line are not adjacent to each other.

FIGS. 6 to 8 are diagrams illustrating an example of a case in which a 90-degree phase retarder is used for a light source array 1100, and a 180-degree phase retarder is used for a receiver 120. Referring to FIG. 6, an example of a case in which a reception line to which a 180-degree phase retarder is connected is adjacent is illustrated.

FIG. 6 can be understood with reference to FIG. 4. In FIG. 6, unlike FIG. 4, the third reception line 423 may be located on the right side and the fourth reception line 424 may be located on the left side. In FIG. 6, the positions of the third reception line 423 and the fourth reception line 424 are different from those of FIG. 4, but since the phase signals applied to the four pixels included in the block are different, depth information can be obtained using four phase information in each block.

Referring to FIG. 7, an example of a case in which a reception line to which a 90-degree phase retarder is connected is adjacent is illustrated. FIG. 7 can be understood with reference to FIG. 6. In FIG. 7, unlike FIG. 6, the third output line 413 may be located below and the fourth output line 414 may be located above. In FIG. 7, the positions of the third output line 413 and the fourth output line 414 are different from those of FIG. 6, but since the phase signals applied to the four pixels included in the block are different, depth information can be obtained using four phase information in each block.

Referring to FIG. 8, an example of a case where a line to which a phase retarder is connected in a reception line and an output line are not adjacent to each other is illustrated. FIG. 8 can be understood with reference to FIG. 4. In FIG. 8, unlike FIG. 4, the first reception line 421 is on the right, the second reception line 422 is on the left, the third reception line 423 is on the right, and the fourth reception line 424 may be located on the left.

In addition, in FIG. 8, unlike FIG. 4, the first output line 411 is located below the second output line 412, and the third output line 413 may be located below the fourth output line 414.

In FIG. 8, the positions of the first reception line 421, the second reception line 422, the third reception line 423, and the fourth reception line 424 are different from the case of FIG. 4, but since the phase signals applied to the four pixels included in the block are different, depth information can be obtained using four phase information in each block.

Figure 9:
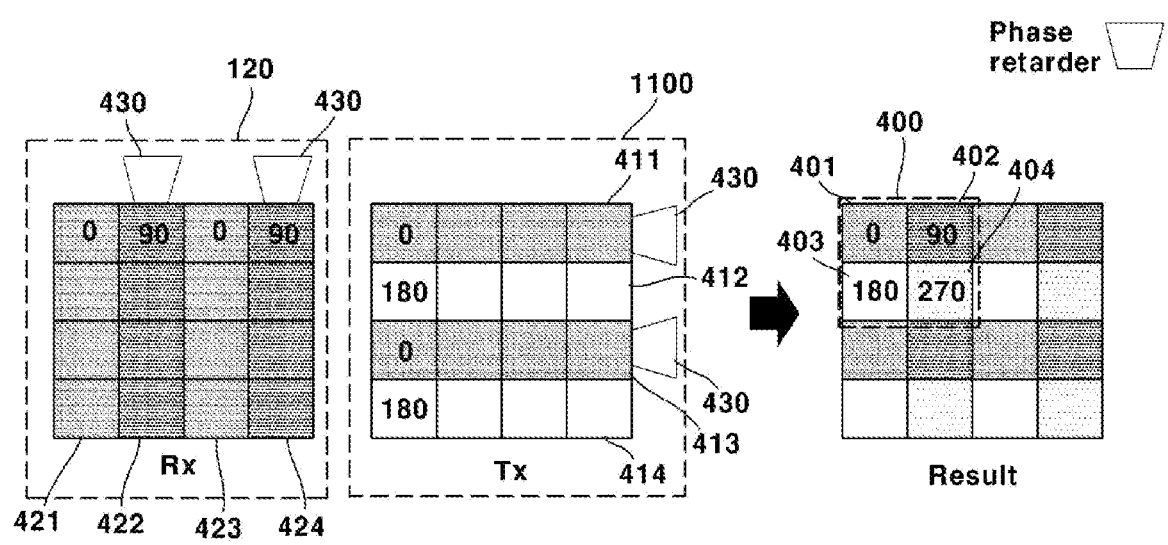
FIG. 9 is a diagram illustrating an example in which a camera module controls reception pixels included in a receiver and a plurality of light sources included in a light source array by line units using a 180-degree phase retarder for the light source array, and a 90-degree phase retarder for the receiver, thereby applying different phase signals to the reception pixels included in a block during each period T.

FIG. 9 is a diagram illustrating an example in which a camera module 100 controls reception pixels included in a receiver 120 and a plurality of light sources included in a light source array 1100 by line units using a 180-degree phase retarder for the light source array 1100, and a 90-degree phase retarder for the receiver 120, thereby applying different phase signals to the reception pixels included in a block 400 during each period T. FIG. 9 can be understood with reference to FIG. 4.

Referring to FIG. 9, the first output line 411 is disposed above the second output line 412, and the first reception line 421 is disposed on the left side of the second reception line 422, but is not limited thereto.

Referring to FIG. 9, a block 400 may include a first pixel 401, a second pixel 402, a third pixel 403, and a fourth pixel 404. The first pixel 401, the second pixel 402, the third pixel 403, and the fourth pixel 404 may be reception pixels.

The first pixel 401 is a pixel on the first reception line 421 that receives light outputted from the pixels on the first output line 411, the second pixel 402 is a pixel on the second reception line 422 that receives the light outputted from the pixels on the first output line 411, the third pixel 403 is a pixel on the first reception line 421 that receives the light outputted from the pixels on the second output line 412, and the fourth pixel 404 may be a pixel on the second reception line 422 that receives light outputted from pixels on the second output line 412.

The processor 1000 according to an embodiment may control a plurality of light sources included in the light source array 1100 in units of lines. The phase retarder 430 may delay the phase for each line. Referring to FIG. 9, a phase retarder 430 may be connected to the second output line 412 and the second reception line 422. The phase retarder 430 may delay the phase by 90 degrees or 180 degrees.

In FIG. 9, unlike the case of FIG. 4, the phase of the light outputted from the second output line 412 may be delayed by 180 degrees from the light outputted from the first output line 411. Alternatively, a time point at which light is outputted from the second output line 412 may be delayed by a time corresponding to the 180-degree phase from a time point at which light is output from the first output line 411.

In addition, a time point at which light reception starts at the second reception line 422 may be delayed by a time corresponding to a 90-degree phase from a time point at which light reception starts at the first reception line 421.

The light outputted from the first output line 411 may be received at the first pixel 401 included in the first reception line 421. Since the light outputted from the first output line 411 was delayed by 0 degree, and the reception time point of the light at the reception line 421 was delayed by 0 degree compared to the light output time point, a 0-degree phase signal can be applied to the first pixel 401.

The light outputted from the first output line 411 may be received at the second pixel 402 included in the second reception line 422. Since the light outputted from the first output line 411 was delayed by 0 degree, and the reception time point of the light at the second reception line 422 was delayed by 90 degrees compared to the light output time point, a 90-degree phase signal can be applied to the second pixel 402.

The light outputted from the second output line 412 may be received at the third pixel 403 included in the first reception line 421. Since the light outputted from the second output line 412 was delayed by 180 degrees, and the reception time point of light at the first reception line 421 was delayed by 0 degree compared to the light output time point, a 180-degree phase signal can be applied to the third pixel 403.

The light outputted from the second output line 412 may be received at the fourth pixel 404 included in the second reception line 422. Since the light outputted from the second output line 412 was delayed by 180 degrees, and the reception time point of the light at the second reception line 422 was delayed by 90 degrees compared to the light output time point, a 270-degree phase signal may be applied to the fourth pixel 404.

The reception time point of the light received by the block 400 may be different in all of the first pixel 401, the second pixel 402, the third pixel 403, and the fourth pixel 404. For example, a phase signal (or a reception time point of light) applied to the first pixel 401, the second pixel 402, the third pixel 403, and the fourth pixel 404 may be different by 90 degrees. Referring to FIG. 4, a first pixel 401 is applied with a 0-degree phase signal, a second pixel 402 is applied with a 90-degree phase signal, a third pixel 403 is applied with a 180-degree phase signal, and a fourth pixel 404 is applied with a 270-degree phase signal, but is not limited thereto, and the type of the phase signal applied to each pixel may vary depending on which line the phase retarder 430 is connected to.

Figure 10:
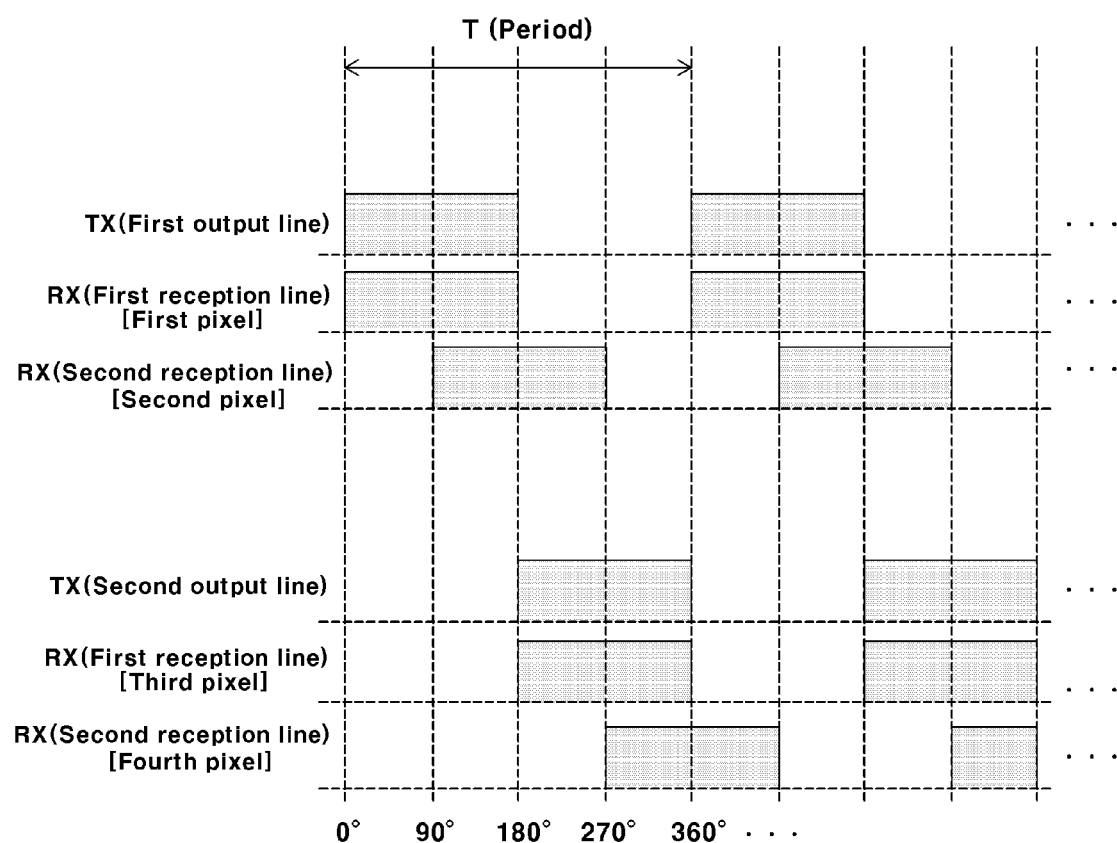
FIG. 10 is a timing diagram illustrating the operation of the camera module of FIG. 9 over time.

FIG. 10 is a timing diagram illustrating the operation of the camera module 100 of FIG. 9 over time.

As illustrated in FIG. 9, in the light source array 1100, since the phase retarder 430 is connected to the second output line 412, the light outputted from the first output line 411 is delayed by 0 degree, and the light outputted from the second output line 412 may be delayed by 180 degrees.

As illustrated in FIG. 9, since the phase retarder 430 is connected to the second reception line 422 in the receiver 120, the time point at which the light reception starts at the first reception line 421 is delayed by 0 degree, and the time point at which light reception is started from the second reception line 422 may be delayed by 90 degrees.

Therefore, referring to FIG. 10, the light output from the first output line 411 is delayed by 0 degree and outputted, and since the first pixel 401, which is a pixel on the first reception line 421 that receives the light outputted from the first output line 411, receives the light delayed by 0 degree, the first pixel 401 may receive a 0-degree phase signal.

In addition, the light outputted from the first output line 411 is delayed by 0 degree and outputted, and since the second pixel 402, which is a pixel on the second reception line 422 that receives the light outputted from the first output line 411, receives the light delayed by 90 degrees, the second pixel 402 may receive a 90-degree phase signal.

In addition, the light outputted from the second output line 412 is delayed by 180 degrees and outputted, and since the third pixel 403, which is a pixel on the first reception line 421 that receives the light outputted from the second output line 412, receives the light delayed by 0 degree, the third pixel 403 may receive a 180-degree phase signal.

In addition, the light outputted from the second output line 412 is delayed by 180 degrees and outputted, and since the fourth pixel 404, which is a pixel on the second reception line 422 that receives the light outputted from the second output line 412, receives the light delayed by 90 degrees, the fourth pixel 404 may receive a 270-degree phase signal.

Figure 11:
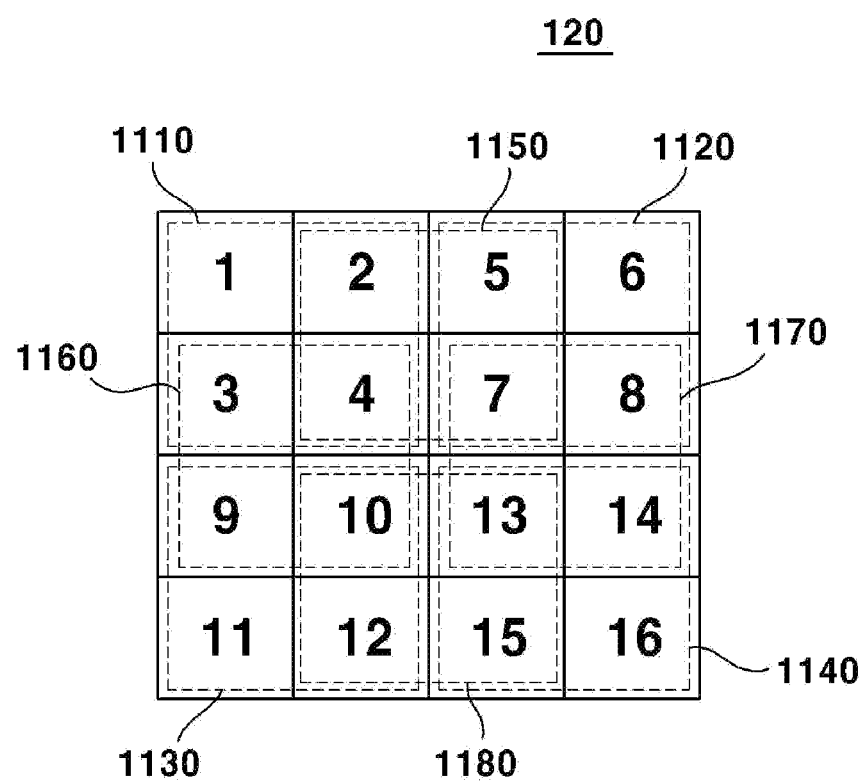
FIG. 11 is a diagram illustrating a method in which a camera module increases the resolution of an image using a super-resolution technique.

FIG. 11 is a diagram illustrating a method in which a camera module 100 increases the resolution of an image using a super-resolution technique.

Meanwhile, the camera module 100 may use a super-resolution (SR) technique to increase the resolution of the depth image according to an embodiment. The SR technique can broadly refer to a method of obtaining a high resolution image from a plurality of low resolution images.

Specifically, the processor 1000 may obtain one depth information in block units. If one depth information can be obtained for each pixel, 16 depth information can be obtained from 16 pixels. However, if one depth information can be obtained in block units, the acquirable information decreases. Since one depth information can be obtained by collecting information of four pixels, in principle, the information that can be obtained can be reduced to a quarter. For example, the processor 1000 may obtain four depth information from the first block 1110, the second block 1120, the third block 1130, and the fourth block 1140.

However, when obtaining one depth information by collecting information obtained from four pixels, more information can be obtained in a case when the used pixel is repeatedly used. For example, the processor 1000 includes the first block 1110 to the fourth block 1140, as well as the fifth block 1150, the sixth block 1160, the seventh block 1170, and the eighth block 1180 can be used further. In addition, in some cases, one depth information may be obtained through four non-adjacent pixels.

In order to obtain one depth information from four pixels, each light applied to the four pixels may include a phase signal for a different phase. For example, a 0-degree phase signal, a 90-degree phase signal, a 180-degree phase signal, and a 270-degree phase signal may be applied to four pixels included in the fifth block 1150, respectively.

In FIG. 11, a case where the number of pixels included in a block is 4 and the number of pixels that overlap between overlapping blocks is 2 is described according to an exemplary embodiment, but is not limited thereto.

Figure 12:
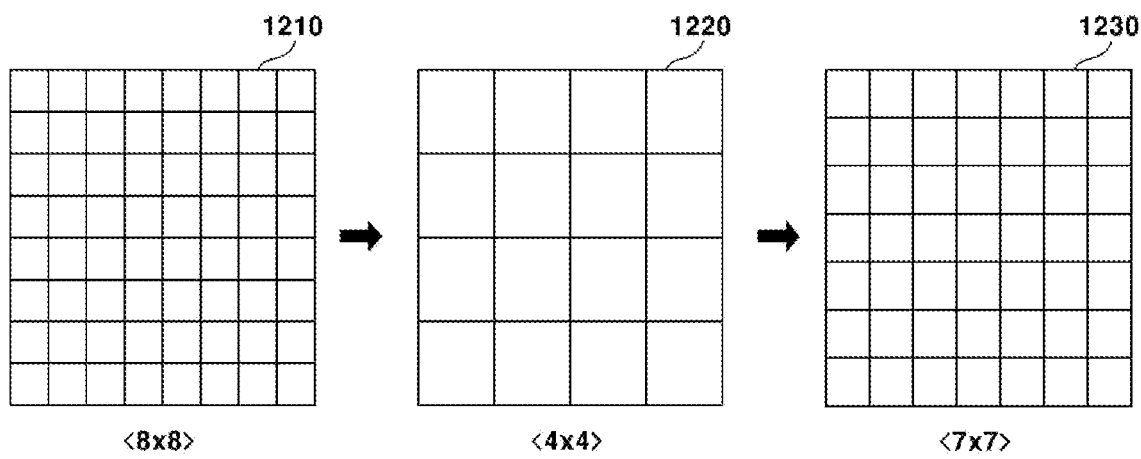
FIG. 12 is a diagram for illustrating an example in which a resolution is increased according to a super-resolution technique, according to an embodiment.

FIG. 12 is a diagram for illustrating an example in which a resolution is increased according to a super-resolution technique, according to an embodiment.

Referring to the first resolution diagram 1210, when information is obtained in units of pixels, a resolution corresponding to the number of pixels may be obtained. However, in the case of obtaining information in block units, when one pixel is used only once, the resolution may decrease by the number of pixels included in the block. For example, the resolution of the second resolution diagram 1220 is reduced to a quarter compared to the first resolution diagram 1210. However, when the above-described SR technique is used, the resolution can be significantly increased, and a resolution higher than the resolution expressed in the third resolution diagram 1230 can be implemented through an additional algorithm.

Figure 13:
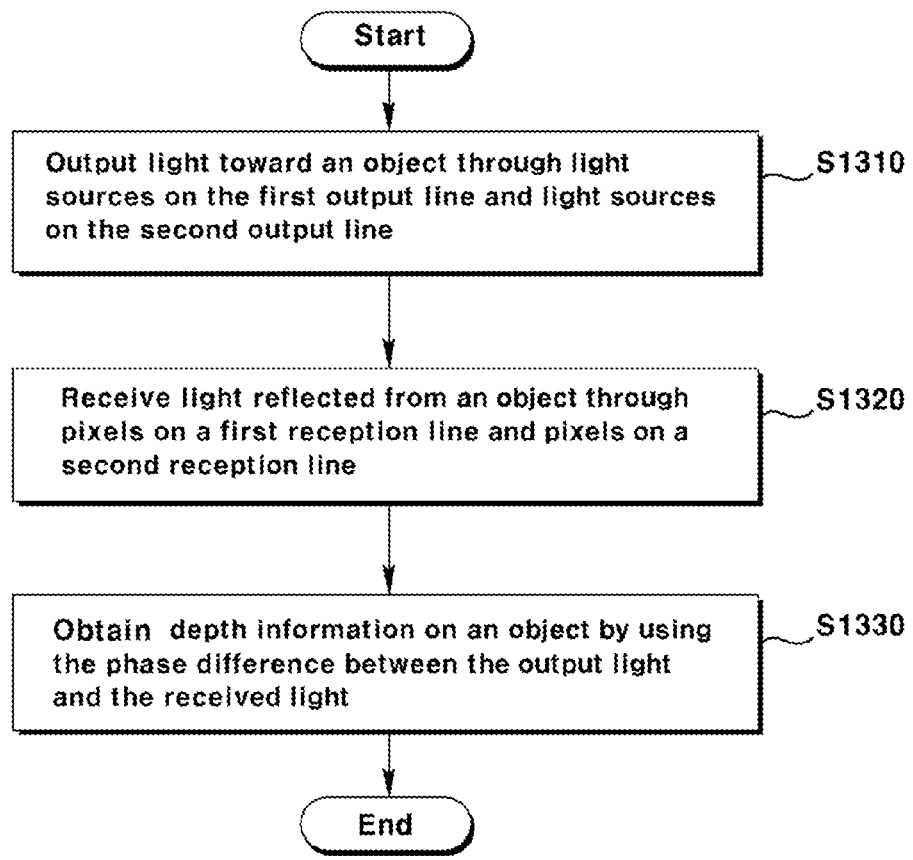
FIG. 13 is a flowchart illustrating a method of obtaining depth information on an object, according to an embodiment.

FIG. 13 is a flowchart illustrating a method of obtaining depth information on an object according to an embodiment. FIG. 13 may be understood with reference to the contents of FIGS. 1 to 12 described above.

In step S1310, the camera module 100 according to an embodiment outputs light to an object through light sources on the first output line and light sources on the second output line, and in step S1320, the camera module 100 according to the embodiment receives light reflected from the object through pixels on a first reception line and pixels on a second reception line.

The phase difference between the light outputted from the light sources on the first output line and the light outputted from the light sources on the second output line is a first value, and when the phase difference between the time point at which light is received at pixels on the first reception line and the time point at which light is received at pixels on the second reception line is a second value, the first value and the second value may be different from each other.

In step S1330, the camera module 100 according to an embodiment obtains depth information on an object by using a phase difference between the output light and the received light. Alternatively, the camera module 100 may obtain depth information on an object by comparing the output time point of the output light and the reception time point of the received light.

Meanwhile, the above-described method can be written as a program that can be executed on a computer, and can be implemented in a general-purpose digital computer that operates the program using a computer-readable recording medium. In addition, the structure of the data used in the above method can be recorded on a computer-readable recording medium through various means. The recording medium that can be read with the above described computer includes a storage medium such as a magnetic storage medium (e.g., ROM, RAM, USB, floppy disk, hard disk, etc.), and an optical reading medium (e.g., CD-ROM, DVD, etc.).

The embodiments of the present invention have been described above with reference to the accompanying drawings, but a person skilled in the art to which the present invention belongs may understand that the present invention can be implemented in other specific forms without changing the technical idea or essential features. Therefore, it should be understood that the embodiments described above are illustrative and non-limiting in all respects.

The invention claimed is:

1. A camera module comprising:
a light source array including a plurality of light sources for outputting light to an object;
a receiver for receiving light reflected from the object through reception pixels;
at least one phase retarder located at the receiver; and
a processor for obtaining depth information on the object by using a phase difference between the light outputted from the light source array and the light received by the receiver,
wherein the light source array includes light sources on a first output line and light sources on a second output line,
wherein the phase difference between the light outputted from the light sources on the first output line and the light outputted from the light sources on the second output line is a first value,
wherein the reception pixels include pixels on a first reception line and pixels on a second reception line,
wherein the phase difference between a time point when the light is received at the pixels on the first reception line and a time point when the light is received at the pixels on the second reception line is a second value due to the phase retarder being located at one of the first reception line or the second reception line, and
wherein the first value and the second value are different values.

2. The camera module according to claim 1, wherein the difference between the first value and the second value is 90 degrees.

3. The camera module according to claim 1, wherein the first output line and the second output line are adjacent to each other, and the first reception line and the second reception line are adjacent to each other.

4. The camera module according to claim 1, wherein the first output line and the second output line are parallel to each other, the first reception line and the second reception line are parallel to each other, and the first output line and the first reception line are orthogonal to each other.

5. The camera module according to claim 1, wherein a first pixel that is a pixel on the first reception line for receiving light outputted from light sources on the first output line, a second pixel that is a pixel on the second reception line for receiving light outputted from light sources on the first output line, a third pixel that is a pixel on the first reception line for receiving light outputted from light sources on the second output line, and a fourth pixel that is a pixel on the second reception line for receiving light outputted from light sources on the second output line are adjacent to each other.

6. The camera module according to claim 5, wherein a reception time point of light received by the receiver is different in all of the first pixel to the fourth pixel.

7. The camera module according to claim 5, wherein a reception time point of light received by the receiver is different by a time corresponding to a 90-degree phase in the first pixel to the fourth pixel.

8. The camera module according to claim 1, wherein the receiver includes a first block and a second block obtained by partitioning the reception pixels, and
wherein the processor obtains the depth information using both light received through the first block and light received through the second block.

9. The camera module according to claim 1, wherein the processor increases resolution by applying a super resolution technique.

10. The camera module according to claim 8, wherein two pixels among four pixels included in the first block and four pixels included in the second block overlap.

11. The camera module according to claim 1, wherein the first value is 180 degrees, and the second value is 90 degrees.

12. The camera module according to claim 1, wherein the first value is 90 degrees, and the second value is 180 degrees.

13. The camera module according to claim 1, wherein the light source array outputs light by performing amplitude modulation or phase modulation according to a control signal received form the processor.

14. The camera module according to claim 1, wherein each of the plurality of light sources output light independently.

15. The camera module according to claim 14, wherein the plurality of light sources output light of different intensities, different frequencies, different phases, and different delay times from each other.

16. A camera module comprising:
a light source array including a plurality of light sources for outputting light to an object;
an image sensor for receiving light reflected from the object through reception pixels and disposed on the printed circuit board;
at least one phase retarder located at the image sensor;
a printed circuit board including a processor; and
a lens assembly including a lens and coupled to the printed circuit board,
wherein the processor obtains depth information on the object by using a phase difference between the light outputted from the light source array and the light received by the image sensor,
wherein the light source array includes light sources on a first output line and light sources on a second output line,
wherein the phase difference between the light outputted from the light sources on the first output line and the light outputted from the light sources on the second output line is a first value,
wherein the reception pixels include pixels on a first reception line and pixels on a second reception line,
wherein the phase difference between a time point when the light is received at the pixels on the first reception line and a time point when the light is received at the pixels on the second reception line is a second value due to the phase retarder being located at one of the first reception line or the second reception line, and
wherein the first value and the second value are different values.

17. A method for obtaining depth information comprising the steps of:
outputting light to an object through light sources on a first output line and light sources on a second output line;
receiving light reflected from the object through pixels on a first reception line and pixels on a second reception line; and
obtaining depth information on the object by using a phase difference between the outputted light and the received light,
wherein the phase difference between the light outputted from the light sources on the first output line and the light outputted from the light sources on the second output line is a first value,
wherein the phase difference between the time point when the light is received at the pixels on the first reception line and the time point when the light is received at the pixels on the second reception line is a second value, and
wherein the first value and the second value are different values.

18. The method for obtaining depth information according to claim 17, wherein the difference between the first value and the second value is 90 degrees.

19. The method for obtaining depth information according to claim 17, wherein the first output line and the second output line are adjacent to each other, and the first reception line and the second reception line are adjacent to each other.

20. The method for obtaining depth information according to claim 17, wherein the first output line and the second output line are parallel to each other, the first reception line and the second reception line are parallel to each other, and the first output line and the first reception line are orthogonal to each other.

* * * * *